W. N. SHANNON.
MEANS FOR SUPPORTING SPARE AUTOMOBILE TIRES.
APPLICATION FILED JUNE 22, 1918.
1,282,961. Patented Oct. 29, 1918.
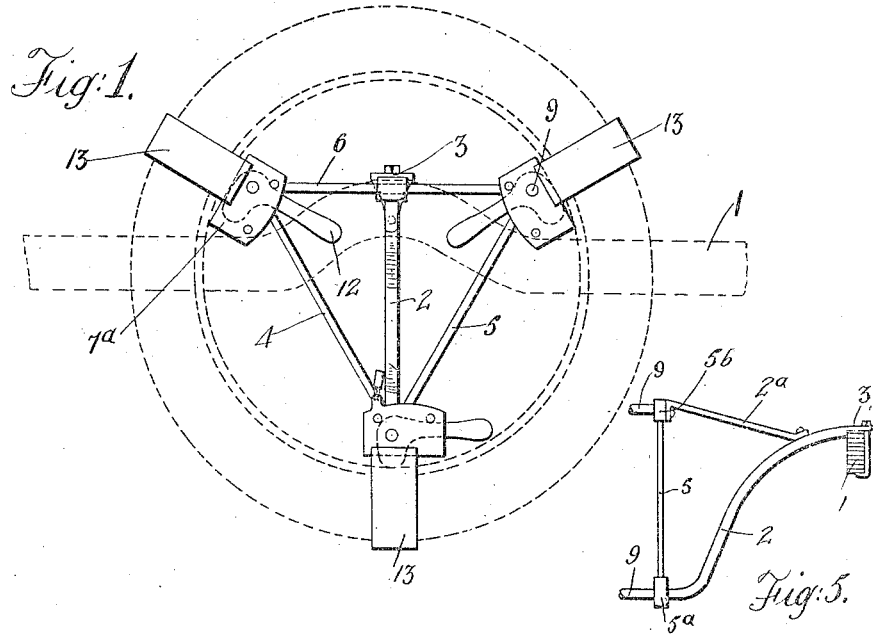
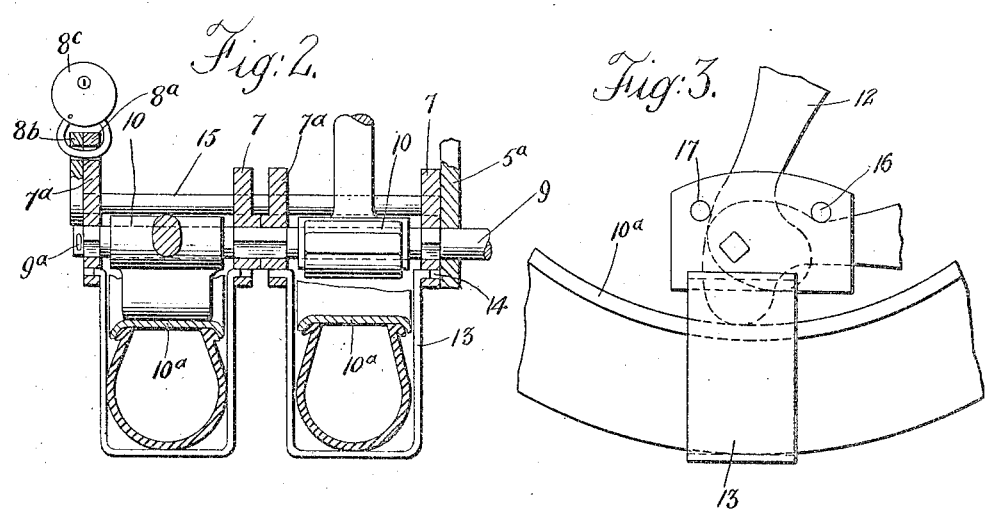
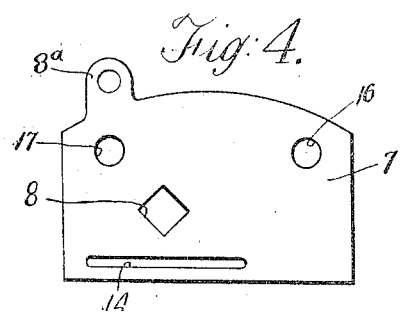

UNITED STATES PATENT OFFICE.

WILLIAM N. SHANNON, OF BROOKLYN, NEW YORK.

MEANS FOR SUPPORTING SPARE AUTOMOBILE-TIRES.

1,282,961.   Specification of Letters Patent.   Patented Oct. 29, 1918.

Application filed June 22, 1918. Serial No. 241,323.

*To all whom it may concern:*

Be it known that I, WILLIAM N. SHANNON, a citizen of the United States, residing in the borough of Brooklyn, county of Kings, city and State of New York, have invented certain new and useful Improvements in Means for Supporting Spare Automobile-Tires, of which the following is a specification.

My invention more particularly relates to new and improved means for supporting tire rims of the demountable type with or without applied inflated tires, of which usually it is customary to carry one or two upon the vehicle to be used when necessity requires.

The object of the invention is to produce new, simplified and readily operated means for supporting such spare rims.

In the accompanying drawings which illustrate by way of example one preferable embodiment of the principles of my invention, Figure 1 is a view in front elevation of a demountable rim with an attached tire shown in dotted outline as well as a supporting portion of the vehicle.

Fig. 2 is a transverse sectional view partly broken away illustrating one form of my invention designed to accommodate two demountable rims with applied inflated tires.

Fig. 3 is a view in side elevation illustrating the two positions of one of the eccentric cam like members employed to engage the demountable rim to hold it in supported position.

Fig. 4 is an enlarged detail of one of a pair of plates between which each eccentric wedge member is mounted.

Fig. 5 is a view in side elevation of the bracket support.

Referring in detail to the various views, 1 indicates a spring or cross frame member of an automobile chassis to which is attached the bracket support for holding the spare rims. This bracket support in the illustrated embodiment may comprise a curved supporting rod or bar 2 suitably fastened to the spring or frame cross member 1 by means of a detachable clamping device 3 or otherwise. This rod 2 carries a triangular supporting frame comprising parts 4, 5 and 6, the extremities of which are joined together and fastened by means of the connecting members $5^a$ and $5^b$.

A pair of strut rods $2^a$ connect the two upper corners of the triangular frame with the bar 2, in order to add rigidity to the supporting frame as a whole. Carried by the connecting members $5^a$ and $5^b$ at the three corners of the triangle and projecting therefrom are rods 9 which may if it be so desired form continuations of the members 2 and $2^a$, in which case they would penetrate the connecting members $5^a$ and $5^b$. These rods 9 form supports for the tire rim clamping instrumentalities and where desired they may be of sufficient length to accommodate two sets of such instrumentalities in order to take care of two spare tire rims as shown in Fig. 2. The rim clamping devices, which take the form of eccentric cams, are mounted upon the rods 9 between plates $7$—$7^a$. The eccentric cams are rotatable upon the rods 9 and are indicated by the numeral 10. These cam devices when in active supporting position, as shown in dotted outline (see Fig. 3), engage the inner circumferential surface of the tire rim at equi-distant points at the corners of the triangular frame. Each cam is provided with an operating handle 12 to afford ready manipulation.

In order to additionally support the tire in position, I may employ metal straps 13, the ends of which are sprung into suitable slots 14 in the plates $7$—$7^a$ (see Fig. 4). It will be manifest that when the handle 12 of the operating cams are manipulated to bring the cam surfaces into engagement with the tire rim (see Fig. 3), the rim with its applied inflated tire will be forced outwardly against the metal straps, thus resulting in pressure being applied to both tire and rim, which results in holding the tire rigidly in position. In order to hold the cam devices in rim locking position, the locking pin 15 (see Fig. 2) may be conveniently inserted through the alined apertures 16 of the plates, thus locking the handle in its active position and holding it there against accidental dislodgment. In order to prevent the handles from being swung in the reverse or unlocking direction to too great an extent, a similar locking pin may be inserted in the alined apertures 17 thus serving as a limiting stop to such backward movement.

In order to prevent unauthorized removal of the spare tires from the support, suitable locking means may be provided. This may consist in making the outer plate 7 with a perforated extension $8^a$ forming the head of the pin 15 with a similar perforation $8^b$ and passing the bow of a padlock $8^c$ there-through. In order to dismount the tire, the padlock is removed whereupon the pin 15 is withdrawn. The handle 12 is then moved inwardly to disengage the eccentric cams of the tire rim. After this has been done, the strap 13 is removed from the plates by applied pressure to spring their ends out of the slots 14 whereupon the tire rim with the applied tire may be slid off from its support.

It will be observed that the eccentric cams are so mounted with respect to the bracket that they will when in active supporting position engage the inner circumferential surface of the tire rim and that all of the cams are mounted so that their active cam surfaces will be brought into operative position when being thrown outwardly or away from the center. It will be manifest from this that rims of varying diameter may be accommodated by supporting means of the described character. The variability in this respect being only limited by the particular shape and size of the eccentric cams.

While I have described one preferable embodiment of the principles of my invention, I do so by way of example and I do not wish to be limited in the matter of structural details as these may be changed or varied without departing from the spirit and scope of the invention as defined by the following claims.

Having thus described my invention what I claim as new herein and desire to secure by Letters Patent is:

1. In a tire bracket for supporting demountable rims, the combination of a pair of perforated plate members, a shaft penetrating said plate members, a rim engaging eccentric member journaled upon said shaft between said plate members, a handle for operating said eccentric member and a locking pin insertible through the perforations of said members for retaining said eccentric in tire rim engaging position.

2. Means for supporting demountable tire rims including a triangular frame like supporting bracket, eccentric cam members pivotally supported on the triangular support, said eccentric members being provided with cam wedging surfaces adapted to engage the inner peripheral surface of a demountable rim and operating handles for oscillating the eccentric members.

3. A bracket support for spare automobile tire rims including a series of plate members supported adjacent to the demountable rim when in supported position, eccentric cam members pivotally mounted between said plate members, means for operating said eccentric members and strap members encircling the tire and fastened to said plate members.

4. Means for supporting a spare demountable rim, including a plurality of eccentric cam members, supporting means for said cam members, said cam members being provided with cam wedging surfaces adapted to engage the demountable rim at spaced apart points along the inner peripheral surface thereof and operating handles for oscillating the eccentric members, substantially as described.

WILLIAM N. SHANNON.